(No Model.)
J. L. CAMPBELL.
WATER INDICATOR FOR BOILERS.
No. 429,997. Patented June 10, 1890.
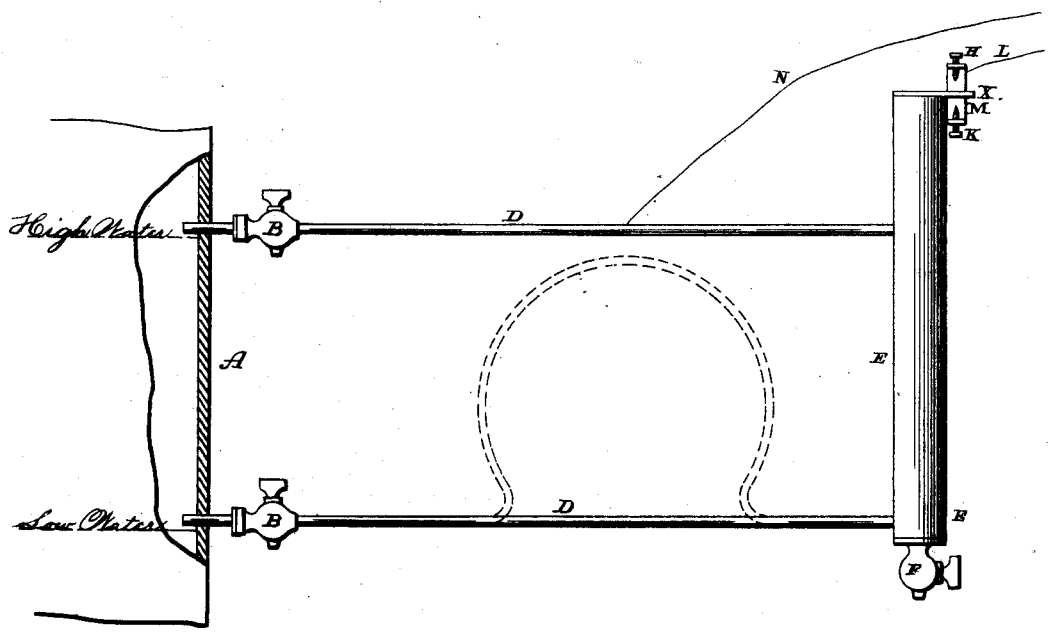

UNITED STATES PATENT OFFICE.

JAMES LOGAN CAMPBELL, OF WEST ELIZABETH, PENNSYLVANIA.

WATER-INDICATOR FOR BOILERS.

SPECIFICATION forming part of Letters Patent No. 429,997, dated June 10, 1890.

Application filed May 13, 1889. Serial No. 310,539. (No model.)

*To all whom it may concern:*

Be it known that I, JAMES LOGAN CAMPBELL, of West Elizabeth, in the county of Allegheny and State of Pennsylvania, have invented certain new and useful Improvements in Electric High and Low Water Indicators for Boilers; and I do hereby declare the following to be a full, clear, and exact description of the invention, such as will enable others skilled in the art to which it pertains to make and use it, reference being had to the accompanying drawing, which forms part of this specification.

My invention relates to an improvement in electrical high and low water indicators for boilers; and it consists in the combination and particular arrangement of parts hereinafter described, and particularly pointed out in the claims.

The object of my invention is to connect to a boiler a vertical pipe or water-gage by means of small jointless elastic springing tubes, which, when the high-water line is reached, allow the water gage or pipe to sink until connection is made with an alarm, and when the low-water line is reached allow the pipe or gage to spring upward, so as to make electrical connection with an electric alarm.

The accompanying drawing represents a side elevation of an indicator which embodies my invention.

A represents the boiler, and connected thereto, just above the high and low water lines, are the two seamless slightly elastic or springing tubes D, of any desired size, and in which are placed the stop-cocks B, for the purpose of shutting off the flow of water and steam through these pipes D to the gage or vertical pipe E, as may be desired. These pipes D may be horizontal, or they may be bent or curved so as to give them a greater amount of elasticity, as may be desired. These pipes extend any suitable distance outward from the boiler, and secured to their outer ends is a vertical pipe or gage E, of any desired size or length, and which is provided with a stop-cock F at its lower end, so that the water can be allowed to flow out from the gage whenever it is desired.

In order to attach this indicator to a boiler, it is only necessary to find the high and low water lines, bore holes through the end of the boiler, and then connect the pipes and adjust the contact-points, when the device is ready for operation. Should the pipe E be made of glass, it will always indicate the height of the water and take the place of the usual water-gage; but in case the pipe should be made of metal the ordinary water-gage may be used. One of the wires N is connected to one of the pipes D or the stop-cocks B and to one pole of the battery, while the other wire L is connected to the frame M, through which the adjustable contacts H K are passed, and to the other pole of the battery. To the pipe E, in between the contacts, is secured a projection X, and which is moved by the sagging or springing of the pipe E, so as to make electrical connection with one of the contacts H K, according as high or low water line is reached. When the water in the boiler stands at any point between these lines, the projection is held between the two contacts without touching either one.

When the boiler has been filled to the high-water line, the water rises to the same level in the vertical tube or gage E, and the weight of the water causes the pipes D to bend, spring, or sag downward, so as to allow the lower end of the pipe or gage E to make contact with the screw K, which has been adjusted to this particular point. Should the water in the boiler sink to the low-water line, which is just below the lower tube B, the water will run out of the pipe E and lower tube D, allowing the elasticity of the tubes or pipes D to raise the gage or pipe E, so as to make contact with the adjustable screw H, which has been regulated to its precise point. Thus it will be seen that the weight of water in the gage or tube E causes the tube to rise or fall and thus make contact with the screw H or K, and thus sound an alarm of any desired kind.

When the water is between the high and low water lines, neither end of the tube E comes in contact with the screws H K, and hence no alarm is given; but if either the high or low water line is reached this tube E is moved positively by the weight of water in one direction and by the elasticity of the pipe D in the other, so that it is utterly impossible for an alarm not to be sounded as long as the battery and the electric bells are in working order.

As will be seen, the tubes D are made from very small light pipes, not over a quarter of an inch in diameter, and are connected both to the boiler and to the tube E without any movable joints at which leakage can take place. After the parts have once been adjusted there is nothing to be done except to keep the battery in order, as the operation of the pipes D and E is entirely automatic.

Having thus described my invention, I claim—

1. In an automatic alarm for boilers, the combination of the supporting and springing tubes which are connected at their inner ends to the boiler, an outer tube connected to their outer ends and into which water passes through the said supporting-tubes, an electric contact adjacent to the said outer tube and engaged thereby, a wire electrically connected to the said outer tube, and a wire electrically connected to the said contact for operating an electric alarm, substantially as shown and described.

2. In an automatic alarm for boilers, the combination of the supporting and springing tubes which are connected at their inner ends to the boiler, an outer tube connected to their outer ends and into which water passes through the said supporting-tubes, an electrical contact projecting from the said outer tube, and a vertical stationary plate adjacent to the said outer tube, provided with two projecting contact-points, which the contact upon the tube alternately engages as the tube moves vertically, a wire electrically connected to said outer tube, and a wire electrically connected to the said plate, the two wires adapted to be connected with an alarm, substantially as shown.

3. In an electric alarm for boilers, the combination of two horizontal supporting and vertically-springing tubes which are connected at their inner ends to the boiler, a vertical tube connected to the outer ends of and wholly supported by the said tubes and into which tubes the water from the boiler passes, a stationary electric contact in the path of the vertical movement of the tube, an electric alarm, and an electric circuit which is formed through the alarm, the vertical tube, and the contact-point, whereby the circuit is opened directly by the tube in its movement, and thus causes the alarm to be sounded, substantially as shown and described.

In testimony whereof I affix my signature in presence of two witnesses.

JAMES LOGAN CAMPBELL.

Witnesses:
J. M. SHOAF,
G. J. CAMPBELL.